UNITED STATES PATENT OFFICE.

NATHAN GRÜNSTEIN, OF FRANKFORT-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

MANUFACTURE, FROM ACETYLENE, OF ACETALDEHYDE AND CONDENSATION AND POLYMERIZATION PRODUCTS THEREOF.

1,044,169. Specification of Letters Patent. Patented Nov. 12, 1912.

No Drawing. Application filed January 23, 1911. Serial No. 604,172.

*To all whom it may concern:*

Be it known that I, NATHAN GRÜNSTEIN, a subject of the Emperor of Russia, and resident of Frankfort-on-the-Main, Germany, have invented certain new and useful Improvements in the Manufacture, from Acetylene, of Acetaldehyde and Condensation and Polymerization Products Thereof, of which the following is a specification.

This invention consists in improvements in the manufacture, from acetylene, of acetaldehyde and condensation and polymerization products thereof.

Erdmann and Köthner (see *Zeitschrift fur Anorg. Chemie*, 18, 1898, page 55) have shown that acetaldehyde can be prepared by passing acetylene through boiling sulfuric acid of about 45% concentration mixed with mercuric oxid. According to their statement, a yield of about 5 per cent. is obtained, a part of the acetylene which is not absorbed being again collected. In that process the absorption of the acetylene passed through the boiling sulfuric acid mixed with mercuric oxid takes place but slowly, and a further disadvantage of the process is that a considerable portion of the acetylene does not enter into the reaction, because, in the hot sulfuric acid solution, higher condensation products are formed and partial resinification thereof takes place. Further, the solution is of a dark color.

I have found that if acetylene be passed through 45 per cent. sulfuric acid mixed with mercuric oxid at a low temperature and at a pressure above atmospheric pressure, the absorption takes place rapidly, the solution being of only a slightly yellow color, and that a good yield of a homogeneous product is obtained. It has also been found that an equally good result is obtained with a solution of a mercurial salt in phosphoric acid of about 25 per cent. if the acetylene be introduced, not at boiling temperature, (as Erdmann and Köthner do with a phosphoric acid of 1.15 specific gravity) but at a much lower temperature, say, for instance, below 70° centigrade. Also the manufacture of acetaldehyde from acetylene can be effected at any temperature, whether high, or low, if the solution of the mercurial salt be effected in sulfuric acid of less than 45 per cent. or in phosphoric acid of less than 25 per cent. or in any other suitable inorganic, or organic, acid (for instance, acetic acid, mono-chlor acetic acid, and the like) or in mixtures of the same. The favorable progress of the reaction depends on the strength of the acid used, or the concentration suitable for such acid, and the temperature at which the process is carried out, so that for each degree of concentration of a given acid, the operation takes place within fully determined temperature limits. Generally speaking, the concentration of the acid and the temperature must bear such relation to each other that as the concentration increases, the temperature employed correspondingly lessens, and vice versa.

With 45 per cent. sulfuric acid, the most favorable temperatures are from 15°, to 25° centigrade. Above from 50°, to 60°, centigrade the absorption becomes worse, while below from 6°, to 9°, centigrade it is at a minimum.

If sulfuric acid of about 20 per cent. be used, a good result can be obtained if the operation be carried on at a higher temperature, acetylene being passed through at about 40° centigrade and the aldehyde being obtained at about 70° centigrade. The most favorable absorption temperature is in this case above 30° centigrade, while at temperatures below from 25°, to 20°, centigrade, the absorption is at a minimum. The raising of the temperature in the latter case is not objectionable, because the above named decrease of the concentration causes also a decrease of the condensing action of the sulfuric acid which no longer causes, to any great extent, formation of higher condensation products. From this it results that with a high concentration of the acid even at ordinary temperature, the formation of higher condensation products (for example crotonic aldehyde) is favored.

In using 25 per cent. phosphoric acid it is best to conduct the process at temperatures between 60° and 25° centigrade, or under slow cooling. With 50 per cent. acid it is possible to operate favorably at, for instance, 30° centigrade, so that acetylene can be passed through for a much longer time than is the case when employing a more dilute acid before it becomes necessary to raise the temperature to distil off the acetaldehyde. The absorption of acetylene ceases almost completely at a temperature of about from 10°, to 7° centigrade.

This invention effects a considerable advance in the manufacture because, by altering the acid concentration, the proportion of reaction products formed (acetaldehyde and its concentration products, principally crotonic aldehyde) can be varied. It is thus possible to obtain as required either more acetaldehyde, or more crotonic aldehyde.

I have further found that a favorable mode of operation is to pass the acetylene through at a low temperature, or to decrease its amount, or even to interrupt its passage intermittingly, in order that, by raising the temperature, or producing a vacuum, the aldehydes formed may be separated, or distilled off. Thereupon acetylene is again passed through the same reaction liquor (which may be cooled if desired) and these alternate operations are repeated, so that large amounts of acetaldehyde can be prepared with the same reaction liquor. As a small portion of the mercurial salt separates out in the series of operations, a corresponding addition of fresh mercuric salt will occasionally be necessary.

I have further found that while the acetylene is being passed through, reagents may be added which are adapted to separate out or dissolve the resulting products. Thus, it is advantageous to add to the acid mercurial salt solution, indifferent salts (for instance sodium sulfate to a sulfuric acid solution) whereby the resulting mixture of acetaldehyde and paraldehyde is salted out and removed from time to time from the condensing action of the sulfuric acid. A like result is obtained if the resulting aldehyde be occasionally extracted, from the acid aqueous solution, by means of a suitable solvent, such, for instance, as ether, or the like.

In all the aforesaid modes of operation, it is important, in order to obtain the greatest possible speed of absorption of the acetylene, to carry out the hydration of the acetylene in an atmosphere of acetylene, which can be done in any convenient way, for example by passing through the reaction vessel a strong current of acetylene so as to remove the air from the reaction vessel by means of the acetylene which has not been absorbed, or the reaction vessel may be exhausted of the air contained therein.

The acetylene must always be introduced while the contents of the reaction vessel are energetically stirred, or agitated, because, other things being equal, the speed of absorption of the acetylene is proportional to the thorough intermixing of the reagents.

The following examples will illustrate how the invention may be carried out, but it is not limited thereto.

Example 1: 400 cubic centimeters of about 45 per cent. sulfuric acid are mixed in a suitable flask, or vessel, with about 15 grams of mercuric sulfate, and a powerful current of acetylene gas is introduced, preferably at a temperature of from 15°, to 25°, centigrade, into the mixture while it is constantly stirred, or agitated. If, as already stated, the air be carefully removed, from 15, to 25 liters, or more of acetylene, will be absorbed per hour. After about 80 liters, or more, of acetylene have been absorbed, the reaction product obtained may be dealt with further in various ways; for example, it can be at once diluted with water and then, if desired, the volatile products can, by a current of steam, be expelled, in the form of a mixture of aldehyde-paraldehyde and crotonic aldehyde. If the mixture, prior to its further treatment, be left for some time, at ordinary temperature, to the further condensing action of the 40% sulfuric acid employed then the yield of crotonic aldehyde increases at the expense of the acetaldehyde.

In general, a yield of from 80, to 90, per cent. is obtained. The products obtained can also be extracted by ether, or the like, and then be subjected to further treatment.

Example 2: 400 cubic centimeters of 25 per cent. phosphoric acid are mixed with about 20 grams of mercuric phosphate. Thereupon acetylene is passed through at ordinary temperature, under the same conditions stated in Example 1, until the absorption perceptibly begins to decrease. Then the supply of acetylene is cut off and the acetaldehyde formed is distilled at from 50°, to 60°, centigrade, and collected in a cooled receiver. After this distillation acetylene is again introduced, with the decrease of temperature the absorption again becomes considerable and increases as the temperature further decreases. During the cooling a time arrives when the simultaneous absorption of acetylene and distilling off of acetaldehyde take place. As however the absorption takes place better at a lower temperature, the temperature is lowered and acetylene is introduced until the absorption perceptibly diminishes; then the temperature is increased, the aldehyde distilled off, acetylene again introduced and so on.

Example 3: Into two liters of 25 per cent. sulfuric acid mixed with 100 grams of mercuric oxid are introduced at a temperature of from 40°, to 50° centigrade, while the mixture is energetically stirred, or agitated, 120 liters of acetylene. Without further diluting of the sulfuric acid, the apparatus is connected with a vacuum pump and the distillation products are passed through water in several condensers connected in series, which water is preferably cooled, from outside, by a refrigerating mixture, or ice water. The aqueous solution of aldehyde is mixed with a little sulfuric acid and the aldehyde distilled off in the usual manner; this aldehyde may be obtained as from 90, to 95, per cent. acetaldehyde (i. e. almost anhydrous) by further fractional distillation. The yield is practically theoretical, as only a very small percentage of crotonic aldehyde remains in the residue of the distillation. By distilling *in vacuo*, the acid mercuric solution is so little altered, that it can be used repeatedly for fresh operations, if the initial acid concentration be restored and the small quantity of salt, deposited as metallic mercury, be replaced as mercuric sulfate. In this use, the periods of introduction of the acetylene can be further shortened with advantages, i. e. less acetylene is introduced and the products formed are at once again distilled off *in vacuo*, so that the resulting acetaldehyde remains exposed for a shorter time to the condensing action of the acid.

From the foregoing it will be understood that for the purpose of this invention, a solution of mercuric oxid in 45 per cent. sulfuric acid is to be regarded as the equivalent of a solution of mercuric oxid in 25 per cent. phosphoric acid.

I claim:

1. The process of producing acetaldehyde and condensation and polymerization products thereof from acetylene, which consists in treating a solution of a mercurial salt in acid with acetylene at a temperature below 70° C.

2. The process of producing acetaldehyde and condensation and polymerization products thereof from acetylene, which consists in treating a solution of a mercurial salt in acid with acetylene, at a temperature below 70° C., while agitating the solution.

3. The process of producing acetaldehyde and condensation and polymerization products thereof from acetylene, which consists in introducing acetylene into a solution of a mercurial salt in acid at a temperature below 70° C., alternately interrupting the addition of acetylene, vaporizing off the aldehyde products by increasing the temperature and again adding acetylene.

4. The process of producing acetaldehyde and condensation and polymerization products thereof from acetylene, which consists in treating a solution of a mercurial salt in acid with acetylene while agitating it, and distilling the products *in vacuo*.

5. The process of producing acetaldehyde and condensation and polymerization products thereof from acetylene, which consists in introducing acetylene into a solution of a mercurial salt in acid at a temperature below 70° C., the air within the reaction chamber being replaced by an atmosphere of acetylene.

6. The process of producing acetaldehyde and condensation and polymerization products thereof from acetylene, which consists in introducing acetylene into a solution of a mercurial salt in acid at a temperature below 70° C. while agitating the solution, the air within the reaction chamber being replaced by an atmosphere of acetylene, and vaporizing off the produced products *in vacuo*.

7. The herein described process of manufacturing acetic aldehyde and its condensation and polymerization products from acetylene, which consists in introducing acetylene into a solution of mercury salt in acids at a temperature below 70° C., while agitating the said solution, the air within the reaction chamber being replaced by an atmosphere of acetylene, the acetylene within the receptacle of the reaction being under pressure.

In testimony whereof I have signed my name to this specification in the presence of two subscribing witnesses.

NATHAN GRÜNSTEIN.

Witnesses:
 FRANZ HASSLACHER,
 ERWIN DIPPEL.